United States Patent
Armstrong (10) Patent No.: US 10,225,029 B2
(45) Date of Patent: Mar. 5, 2019

(54) SYSTEM AND METHOD FOR GENERATING CUSTOMIZED DIGITAL CONTENT FROM A RADIO FEED

(71) Applicant: 121cast Pty Ltd, Melbourne (AU)

(72) Inventor: Andrew Armstrong, Southbank (AU)

(73) Assignee: 121cast Pty Ltd, Melbourne, Victoria (AU)

( * ) Notice: Subject to any disclaimer, the term of this patent is extended or adjusted under 35 U.S.C. 154(b) by 285 days.

(21) Appl. No.: 14/524,852

(22) Filed: Oct. 27, 2014

(65) Prior Publication Data

US 2016/0119067 A1  Apr. 28, 2016

(51) Int. Cl.

| | |
|---|---|
| *G06F 17/00* | (2006.01) |
| *H04H 40/27* | (2008.01) |
| *G06Q 30/02* | (2012.01) |
| *H04H 20/93* | (2008.01) |
| *H04H 20/95* | (2008.01) |
| *H04L 29/06* | (2006.01) |
| *H04H 20/10* | (2008.01) |
| *H04H 60/79* | (2008.01) |

(52) U.S. Cl.
CPC ......... *H04H 40/27* (2013.01); *G06Q 30/0241* (2013.01); *H04H 20/103* (2013.01); *H04H 20/93* (2013.01); *H04H 20/95* (2013.01); *H04L 65/4084* (2013.01); *H04L 65/80* (2013.01); *H04H 60/79* (2013.01)

(58) Field of Classification Search
CPC ...... H04H 40/27; H04H 20/103; H04H 20/10; H04H 20/106; H04H 20/93; H04H 20/95; H04H 60/79; H04H 60/76; G06Q 30/0241; H04L 65/4084; G06F 3/165; H04N 21/23424; H04N 21/4331; H04N 21/458
See application file for complete search history.

(56) References Cited

U.S. PATENT DOCUMENTS

| | | | |
|---|---|---|---|
| 6,684,249 B1 | 1/2004 | Frerichs | |
| 7,203,758 B2* | 4/2007 | Cook | H04N 7/165 348/E7.063 |
| 2012/0184202 A1* | 7/2012 | Gadoury | H04H 20/10 455/3.06 |
| 2013/0102241 A1* | 4/2013 | Devine | H04H 20/86 455/3.06 |
| 2015/0350694 A1* | 12/2015 | Meembat | G11B 27/036 725/32 |

* cited by examiner

*Primary Examiner* — Fan S Tsang
*Assistant Examiner* — David Siegel
(74) *Attorney, Agent, or Firm* — DLA Piper LLP US (57) ABSTRACT

The embodiments disclosed herein automatically process data from a data source, optionally extract certain content such as advertisements, and optionally insert personalized content in place of the extracted content to generate customized data. The customized data in turn can be distributed to client devices in multiple ways, such as through Internet streaming or podcast downloads.

15 Claims, 9 Drawing Sheets

SYSTEM AND METHOD FOR GENERATING CUSTOMIZED DIGITAL CONTENT FROM A RADIO FEED

TECHNICAL FIELD

An improved system for generating customized digital content from a radio feed is disclosed.

BACKGROUND OF THE INVENTION

Broadcast radio has been known in the prior art for over a century. More recently, broadcast radio stations have been streaming digital versions of their broadcasts on the Internet, and users are able to listen to those digital versions using a web browser or other application on a device connected to the Internet.

Because broadcast radio stations traditionally are local in their physical reach and in their content, it is sometimes desirable to filter out certain content from a broadcast radio program before streaming it on the Internet. For example, a program may comprise a host talking and the playing of music, local advertisements, and local weather, and traffic announcements. This content is useful for actual broadcast, since the audience is located in the same area for which the content was generated. However, it is less useful for an audience of Internet streaming, as the audience can be located anywhere in the world.

Figure 1:
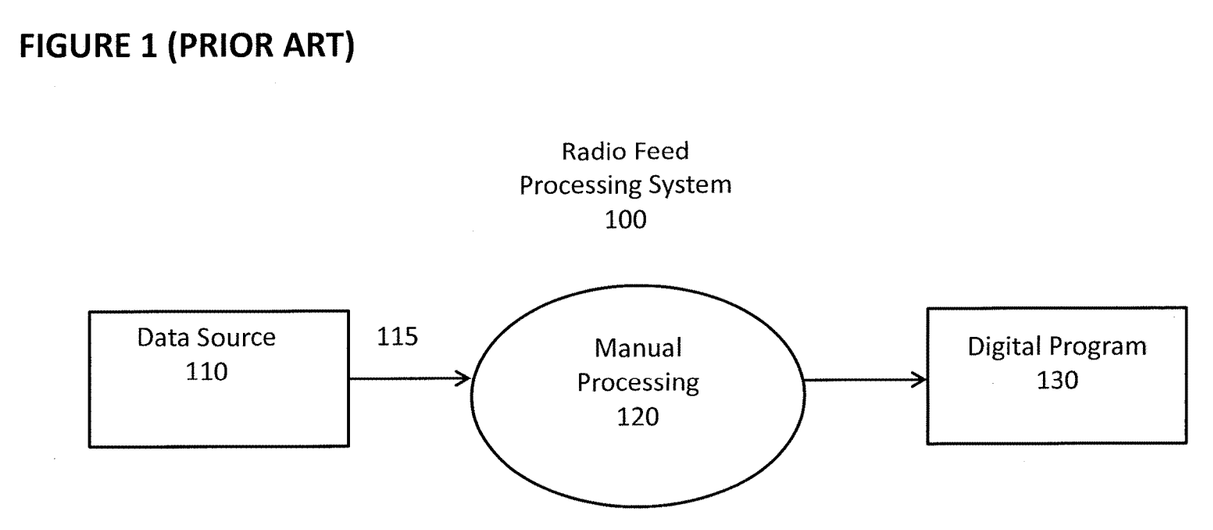
FIG. 1 depicts a prior art system for manually processing data from a data source.

The prior art therefore contains attempts to alter broadcast content for an Internet audience. In FIG. 1, radio feed processing system 100 is depicted. A radio station includes data source 110 that generates data 115, which can be a radio feed. Data 115 can comprise a host talking as well as music, jingles, advertisements, pre-recorded content, weather and traffic announcements, and other content. Data 115 undergoes manual processing 120 by a human being. Manual processing 120 may include turning a recording on and off whenever the host starts or stops talking or when an advertisement or local content plays, or a human being might modify data 115 using computer software. The end result of manual processing is digital program 130 (which can be either streamed or downloaded), which is a filtered version of data 115. For example, digital program 130 may include only the talking by the host from data source 110 and nothing else. Notably, digital program 130 may be imperfect if the human made a mistake during the manual processing 120. In addition, digital program 130 will be a significantly delayed version of data 115, as time is required for the human to perform manual processing 120. The delay typically is several hours.

Radio feed processing system 100 is an imperfect, time-consuming, and expensive system, and many broadcast radio stations do not have the resources to engage in such activities to create digital program 130.

What is needed is a system that can process data automatically, with minimal processing delay, to remove certain content and to send the result to a user in a real-time, near-real time, or delayed manner as requested by the user. What is further needed is the ability to add new content that is customized for a particular user to the data.

SUMMARY OF THE INVENTION

The embodiments disclosed herein automatically process data from a data source, optionally extract or remove certain content such as commercials, music or other content, and optionally insert content generated for a particular user to generate customized data for that user. The customized data in turn can be distributed to client devices in multiple ways, such as through Internet streaming, podcasts, downloads, web-based playback, and mobile app playback.

DETAILED DESCRIPTION OF THE PREFERRED EMBODIMENTS

Figure 2:
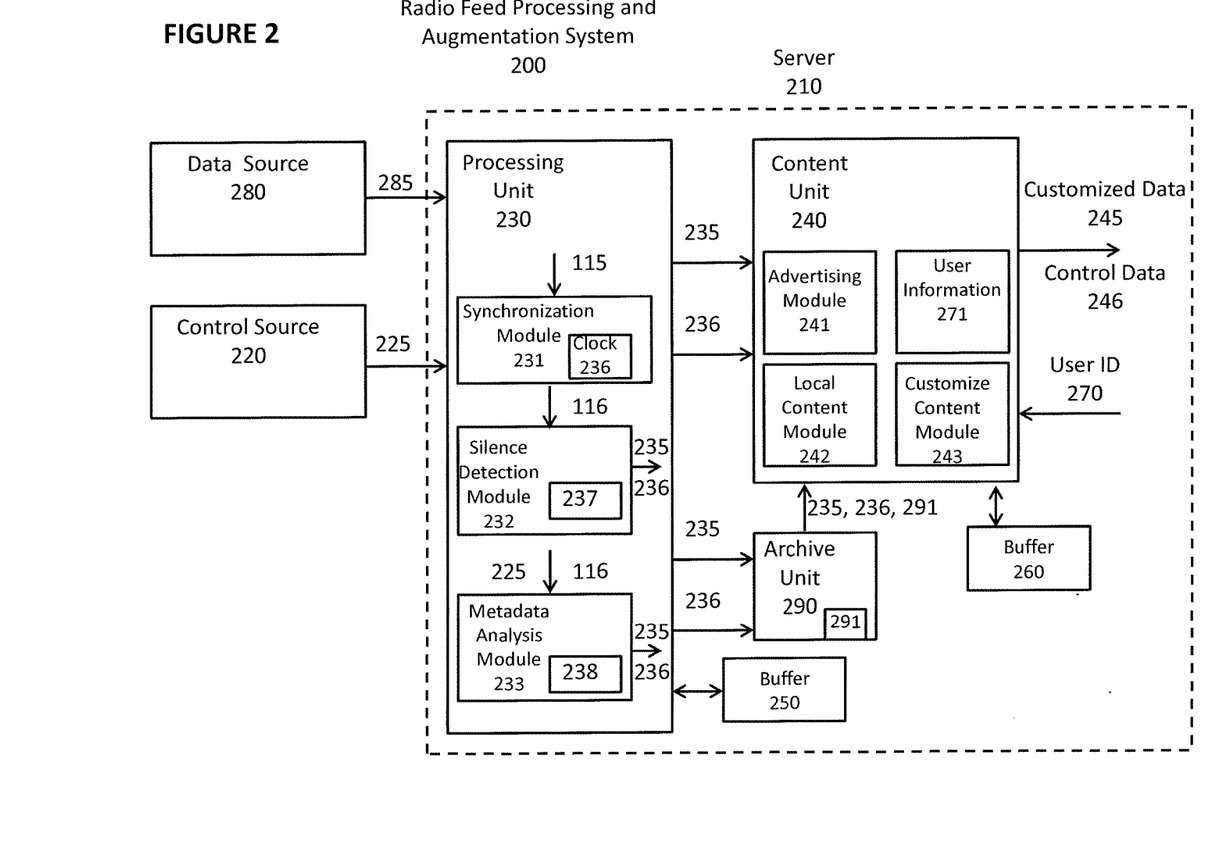
FIG. 2 depicts an embodiment of a system for automatically processing data from a data source to generate customized data.

FIG. 2 depicts radio feed processing and augmentation system 200. Radio feed processing and augmentation system 200 comprises server 210 that receives data 285 from data source 280 and optionally receives control data 225 from control source 220. Data 285 can comprise, for example, a data feed from a radio station broadcast, a private data feed from a radio station, streaming or downloaded data from the Internet, or any other digital content. Data 285 can be received live from data source 280 (as would be the case during a radio station broadcast), or it can be received in near-live form (as might be the case with Internet streaming of content from a radio station, where the delay is miniscule from the time the content is created), or it can be received in delayed form (as might be the case with a downloaded audio file from the Internet, where the delay is more than miniscule from the time the content is created).

Figure 7A:
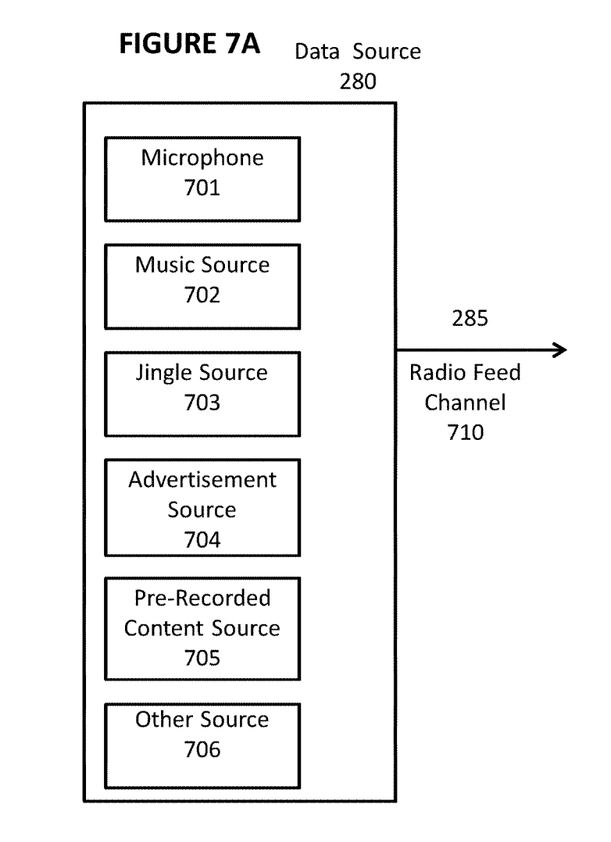
FIG. 7A depicts an embodiment of a data source and a data channel.
Figure 7B:
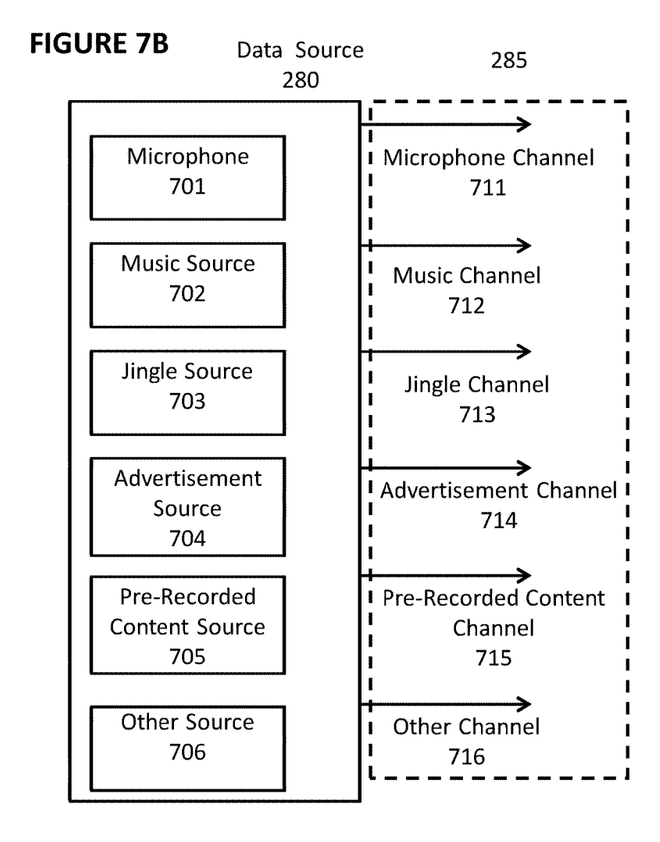
FIG. 7B depicts an embodiment of a data source and a plurality of data channels.
Figure 7C:
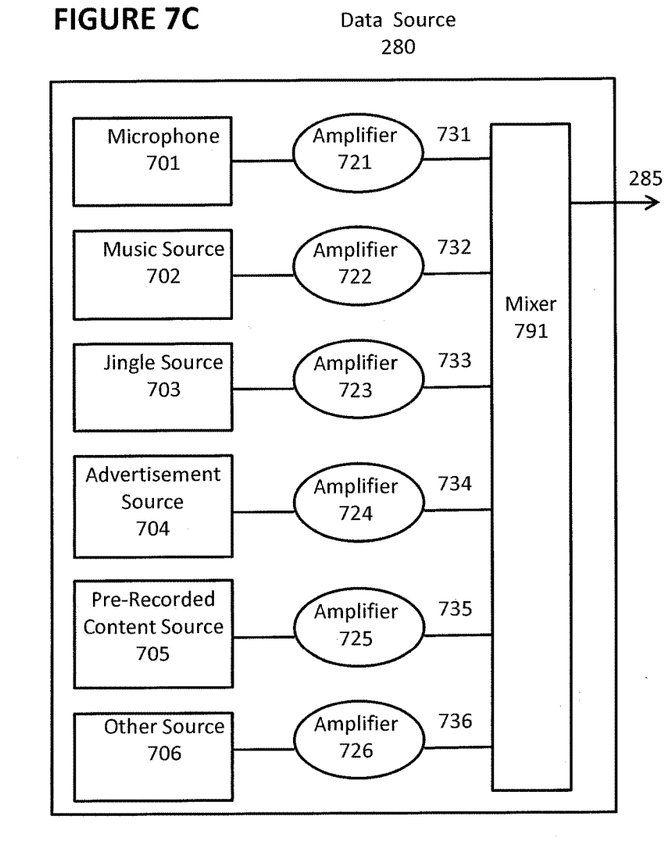
FIG. 7C depicts an embodiment of a data source, a plurality of amplifiers, a mixer, and a plurality of data channels.

With reference now to FIGS. 7A, 7B, and 7C, data source 280 can comprise microphone 701, music source 702, jingle source 703, advertisement source 704, pre-recorded content source 705, and other source 706. Data 285 comprises some or all of the output of data source 280. With reference to FIG. 7A, data 285 in one embodiment comprises radio feed channel 710, which is a single channel that contains the output of microphone 701, music source 702, jingle source 703, advertisement source 704, pre-recorded content source 705, and other source 706. With reference to FIG. 7B, data 285 in another embodiment comprises microphone channel 711 containing the output of microphone 701, music channel 712 containing the output of music source 702, jingle channel 713 containing the output of jingle source 703, advertisement channel 714 containing the output of advertisement source 704, pre-recorded content channel 715 containing pre-recorded content source 705, and other channel;

716 containing the output of other source 706. Thus, as shown in FIG. 7A, in one embodiment data 285 comprises a single channel of data that contains the entire radio feed (e.g., host talking, music, jingles, jingles, advertisements, pre-recorded content, etc.) that is output from the radio station broadcast or Internet broadcast. As shown in FIG. 7B, in another embodiment, data 285 comprises a plurality of channels of data and can comprise all available channels or a subset thereof. For example, data 285 could comprises only microphone channel 711 and pre-recorded content channel 715, which would be the case if the operator of data source 280 had the ability to select the channels to be provided to server 210 as data 285.

The various audio signals can be amplified and mixed in various combinations, as will now be discussed with reference to FIG. 7C.

With reference to FIG. 7C, microphone 701 is input to amplifier 721 to generate amplified microphone signal 731, music source 702 is input to amplifier 722 to generate amplified music signal 732, jingle source 703 is input to amplifier 723 to generate amplified music signal 733, advertisement source 704 is input to amplifier 724 to generate amplified music signal 734, pre-recorded content source 705 is input to amplifier 725 to generate amplified pre-recorded signal 735, and other source 706 is input to amplifier 716 to generate amplified other signal 736. Amplifiers 721, 722, 723, 724, 725, 726 are variable amplifiers that can attenuate the input or amplify the input. Optionally, amplifiers 721, 722, 723, 724, 725, and 726 can be controlled by sliders often managed by panel operators in radio stations.

Amplified signals 731, 732, 733, 734, 735, and 736 each can be used as data 285 and/or can be sent to mixer 791. For example, if amplifiers 722 and 724 are turned down completely (so that music source 702 and advertisement source 704 are completely attenuated, and amplified signals 732 and 734 generate a signal of 0 amplitude), and if amplifiers 721, 723, 725, and 726 are placed in a middle position and input to mixer 791, then the output of mixer 791 can be used as data 285 and would comprise a balanced combination of the outputs of microphone 701, jingle source 703, pre-recorded content source 705, and other source 706.

It will be understood that additional amplifiers and mixers of the same design of FIG. 7C can be used to create other combinations of audio signals.

With reference again to FIG. 2, server 210 comprises processing unit 230 and content unit 240. Processing unit 230 comprises synchronization module 231, optional silence detection module 232, and metadata analysis module 233 and generates filtered data 235. Content unit 240 comprises advertising module 241, local content module 242, and other content module 243 and generates customized data 245 and control data 246.

Processing unit 230 and content unit 240 each comprise one or more CPUs, and optionally can share the same CPU or CPUs. Synchronization module 231, silence detection module 232, metadata analysis module 233, advertising module 241, local content module 242, and other content module 243 each comprise lines of software code executed by processing unit 230 and content unit 240. Other content module 243 can generate content that is used for a particular user, or it can comprise instructions or software code that causes client 410 (shown in FIGS. 4 and 5) to identify and play content, such as playing music that is stored locally on client 410.

Server 210 further comprises buffer 250 and buffer 260. Buffer 250 is utilized by processing unit 230 for storage, and buffer 260 is utilized by content unit 240 for storage. Buffer 250 and buffer 260 each comprise volatile memory (such as RAM) and/or non-volatile memory (such as flash memory), and buffer 250 and buffer 260 optionally can be part of the same physical memory device.

In one embodiment, control source 220 is not used or is not present. Data source 280 will generate data 285. Data 285 preferably comprises digital data. If data 285 comprises analog data, then processing unit 230 will perform analog-to-digital conversion of data 285 to generate a digital version of data 285.

In another embodiment, control source 220 is used. The control source is a synchronized control data stream with the audio data source that will indicate when certain control data actions take place, such as "Ad break starting" or "Music playing" and "Radio host returned to air." Other control data may include the song title that was going to be played on-air, the title of the talk show segment, or other metadata synchronization. Control source 220 would enable radio feed processing and augmentation system 200 to receive a more raw audio stream that includes advertisements and music to be removed from data 285 based control data 225. Control source 220 optionally can provide richer metadata to assist with customizing the stream (such as the talk show segment title).

Synchronization module 231 comprises clock 236 that generates data and time information. Clock 236 can be generated by a CPU within server 210, or it can be obtained from a source external to server 210, such as over the Internet. Synchronization module 231 generates timestamp information and adds timestamp information to data 285 to generate timestamped data 116. Synchronization module 231 may be part of data source 280 and/or control source 220 as part of the data source stream. For example, timestamp information may be included with data 285.

Further, data 285 and control data 225 may be received as a single stream with metadata embedded in a single stream using an audio or data container format.

Silence detection module 232 analyzes data 285 or timestamped data 285 to identify periods of silence that exceed a predetermined threshold (for example, 10 seconds above or below a decibel level), or detection of when audio streams are turned off or muted (such as microphones, jingles, or pre-recorded content being switched off or muted). Silence detection module 232 generates a flag or other indicator when silence is detected. The detection of silence indicates that no content is playing (such as talking, jingles or pre-recorded content). Silence detection module 232 generates a data structure 237 that indicates (for example, by reference to timestamp data) the periods in which the host is talking, or other important radio show content is being transmitted (such as jingles and pre-recorded content). Processing unit 230 can use then use data structure 237 and timestamped data 285 to extract only the desired portions in the data source (for example, the host talking and the playing of jingles and pre-recorded content), and can output that data as filtered data 235. Filtered data 235 then comprises only the portions of data 285 that are relevant to the platform.

In another embodiment of radio feed processing and augmentation system 200, control source 220 is present and is used. Control source 220 generates control data 225 related to data 285. For example, the host or a radio station panel operator can flip a switch (including a switch on the microphone or operator panel) or press a button each time the host goes "off the air" or stops talking, and can then flip the switch in the other direction or press a different button when he or she is back "on the air" or is resuming talking or is playing desired content such as pre-recorded content. In another embodiment, control data 225 can be generated based on inferences made based upon activity by the host or radio station panel operator. For example, if a radio station panel operator turns down or turns off advertisement channel 714, one could infer that the host will begin talking soon. Thus, the turning down or turning off of advertisement channel 714 could trigger the generation of data within control data 225 to indicate the beginning of the host talking. Control data 225 can comprise, in one embodiment, a stream of 1's when the host is on the air or talking or desired content is playing such as pre-recorded content and a stream of 0's when the host is off the air or not talking or no desired content is playing. Control data 225 also can comprise, in another embodiment, a "1" when a change occurs and optionally "0's" otherwise. Thus, a "1" might indicate the host is beginning to talk, and the next "1" may indicate that the host has stopped talking. The use of control data 225 can lessen the need for silence detection module 232 to detect silence and determine periods when the relevant content is playing (such as the host talking or jingles or pre-recorded content) or control data 225 can be used to corroborate the determinations made by silence detection module 232.

Synchronization module 231 operates in the same manner described previously and generates timestamped data 116. Metadata analysis module utilizes control data 225 to generate data structure 238 that indicates (for example, by reference to timestamp data) the periods in which, for example, the host is talking or a jingle or pre-recorded content is playing. Processing unit 230 can use then use data structure 238 and timestamped data 285 to extract, for example, only the portions in which the host is talking or a jingle, pre-recorded content, or other desired content is playing and can place that content into filtered data 235. Filtered data 235 then comprises only the portions of data 285 where the host is talking or a jingle, pre-recorded content, or other desired content is playing.

In both embodiments, filtered data 235, and optionally, control data 236, is provided to content unit 240 and/or archive unit 290. Control data 236 comprises data structure 237 or data structure 238, or modified versions thereof, that indicates relevant periods of interest.

Content unit 240 analyzes filtered data 235 and control data 236 to identify the periods in which empty space exists or the point in time when empty space begins, and it optionally determines the amount of time of the empty space. Content unit 240 can then add new content to filtered data 235 to either fill the empty space exactly or to fill more than or less than the empty space. For example, 60 seconds of empty space can be filled with multiple content pieces (each 30 seconds long, for example), or an exact match of the 60 second period, or shorter/longer content pieces.

Content unit 240 obtains user ID 270, which is a unique identifier for a particular user. Content unit 240 has access to user information 271 corresponding to user ID 270. User information 271 comprises, for example, the user's physical location, demographic information, previous consumption analytics, and preferences.

Advertising module 241 generates customized advertising for user ID 270 based on user information 271. Local content module 242 generates content relevant to the user associated with user ID 270 based on the user's location, such as local weather or local news. Customized content module 243 generates content customized for the user associated with user ID 270 based on user information 271, such as music, news or other dynamic content that the user would enjoy (such as reading the user's calendar from client 410 or the scores from games played by the user's favorite sports team).

Archive unit 290 comprises non-volatile storage, such as one or more hard disk drives or flash memory arrays. Archive unit 290 stores filtered data 235 and control data 236 in a form that can be accessed at a later time. For example, archive unit 290 can store a radio program as digital content 291. Digital content 291 can comprise an MPEG file, an MP3 file, raw data, or other data format. At a later time, digital content 291 can be transferred to content unit 240, or filtered data 235 and control data 236 can be transferred in their original form. Optionally, the data stored by archive unit 290 can be searchable be a user, so that the user can find and request the stored content. Content unit 240 can process the received data in the same manner described previously.

Figure 3:
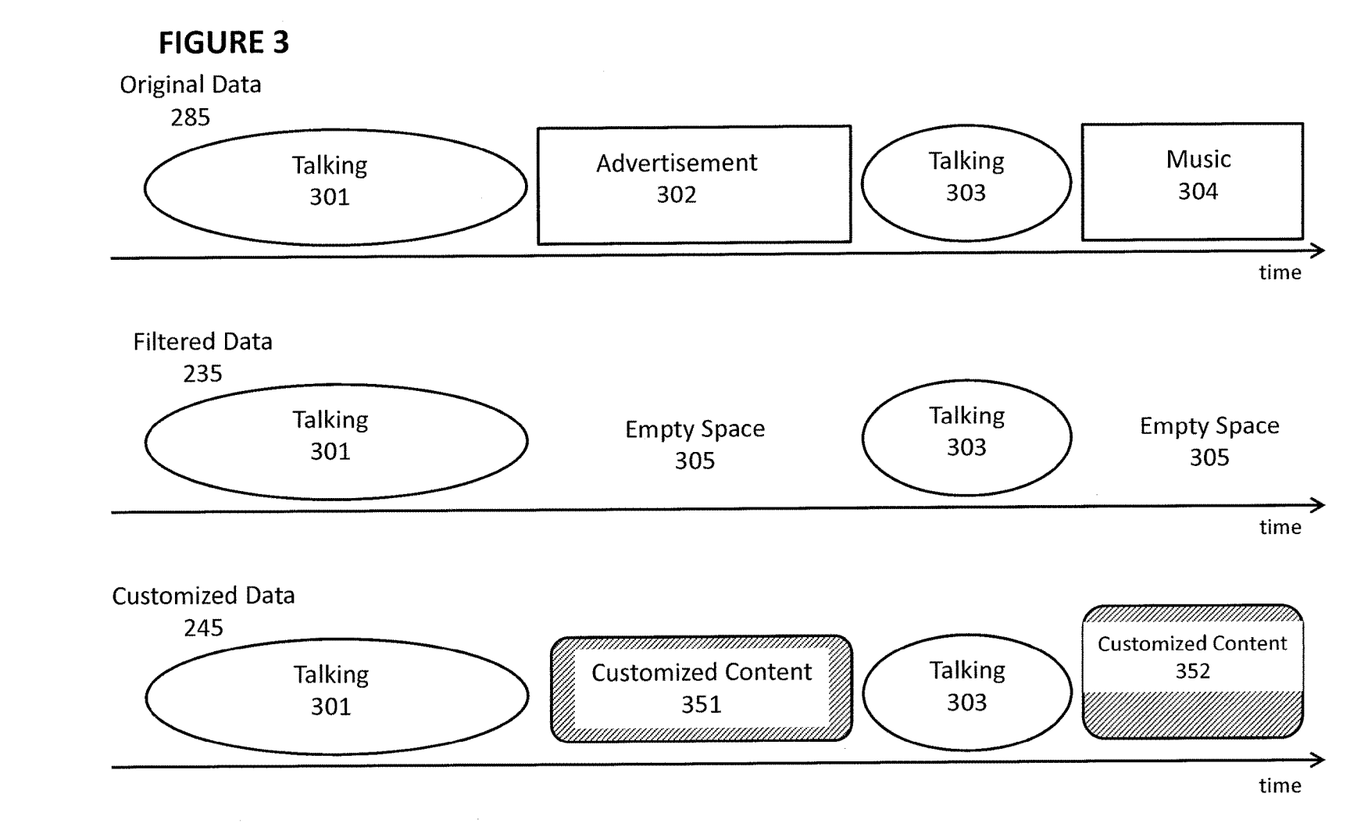
FIG. 3 depicts an exemplary set of filtered data and customized data generated based on data from a data source.

With reference to FIG. 3, an example of the data flow for radio feed processing and augmentation system 200 is shown. Data 280, in this example, comprises a data sequence 301 of talking, followed by a data sequence 203 of advertising, followed by a data sequence 303 of talking, followed by a data sequence 304 of music. Filtered data 235 (generated by processing unit 230), comprises data sequence 301 of talking followed by empty space 305 (corresponding to the location where data sequence 302 of advertising existed in data 280), followed by data sequence 303 of talking, followed by empty space 305 (corresponding to the location where data sequence 304 of music existed in data 280). In this example, customized data 245 (generated by content unit 240 and/or client 410) comprises data sequence 301 of talking followed by data sequence 351 customized content followed by data sequence 303 of talking followed by data sequence 352 of customized content. It will be understood that data sequence 351 of customized content and data sequence 352 of customized content can be any type of customized content, such as: local weather, local news, personalized advertisements, personalized music, movie reviews, or any other type of content. The customized content (such as data sequences 351 and 352) can be the same temporal length, a shorter temporal length, or a larger temporal length as the empty space 305 it is replacing In addition, a single clip or multiple clips can be used to replace each empty space 305. Thus, it can be understood that customized data 245 comprises all or part of data 280 with customized content substituted for the certain portion of data 280 (for example, personalized advertisements substituted for music 304).

Data sequence 351 of customized content and data sequence 352 of customized content can be generated in various ways, three examples of which will now be described. Under a first approach, customized data 245 contains data sequence 351 of customized content and data sequence 352 of customized content and sends that data to client 410. Under this approach, customized data 245 can comprise a data stream containing audio data and any associated metadata in a single container stream (for example, AAC, MP4 or MPEG-DASH) that is presentable and playable by the client 410 directly.

Under a second approach, customized data 245 comprises a playlist of content using metadata that client 410 utilizes to present and play the content. The playlist would comprise an explicit order of content metadata, and each item of content metadata may have a title, image URL or pointer, and audio URL or pointer which is then used by client 410 to present and play the content on a per item basis. For example, the playlist can include metadata to content (such as songs) that client 410 stores locally and which client 410 will then use for customized content, such as for data sequence 351 of customized content and data sequence 352 of customized content. This approach requires less data to be transmitted from server 210 to client 410, since the playlist and metadata typically would be much smaller than the actual content (e.g., music file) itself.

Under a third approach, customized data 245 comprises a playlist of content using metadata that client 410 utilizes to present and play the content as in the second approach. However, under the third approach, client 410 obtains data sequence 351 of customized content and data sequence 352 of customized from server 420 (shown in FIG. 4) as additional content 420 based on the playlist. Server 420 can store, for example, music clips that are provided as additional content 420 based on the playlist.

Figure 4:
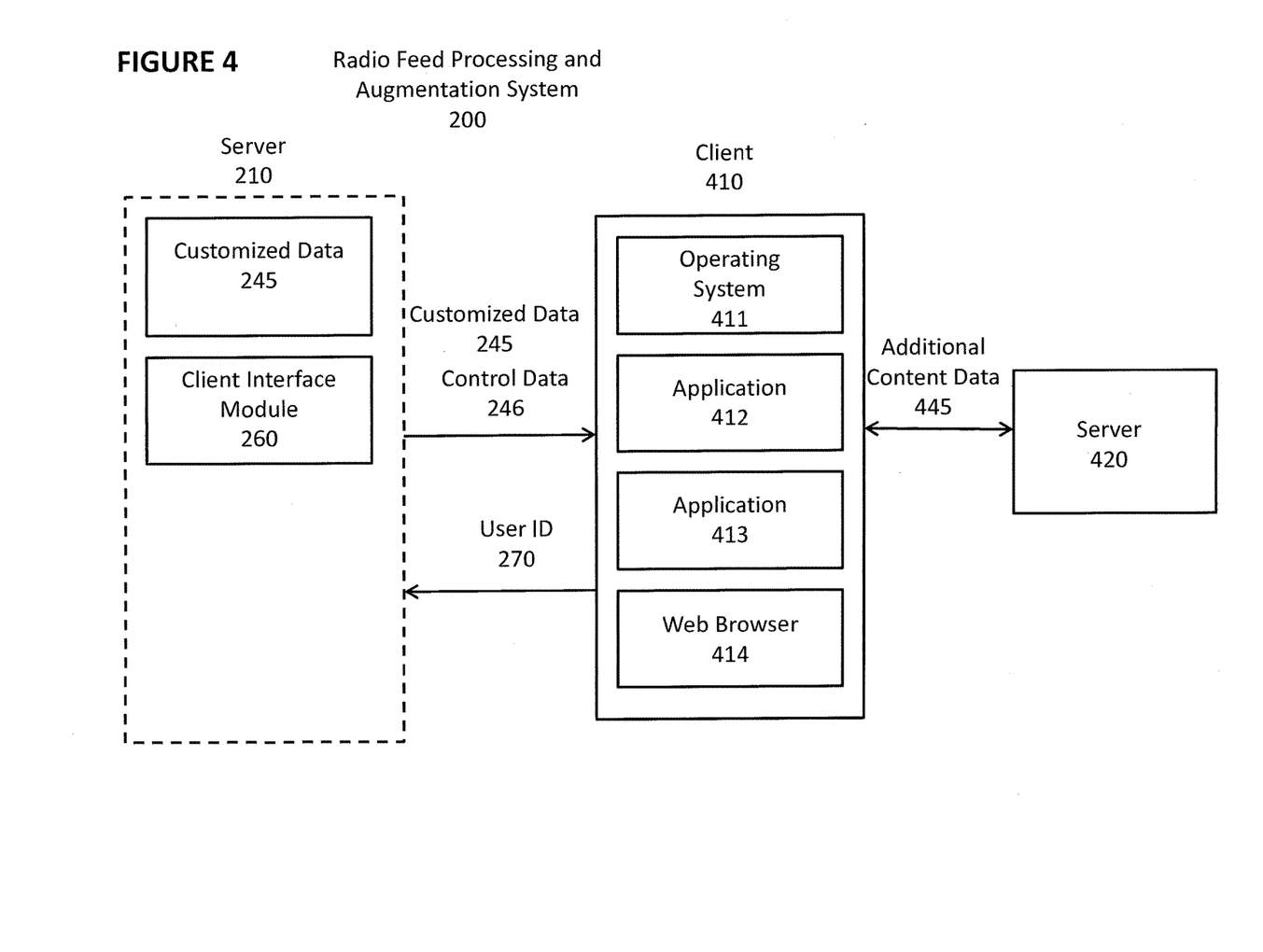
FIG. 4 depicts an embodiment of a system for delivering customized data to a client.

With reference to FIG. 4, an additional aspect of radio feed processing and augmentation system 200 is depicted. Server 210 has generated customized data 245 as described previously. Client interface module 260 is a module for interfacing with clients and can comprise a web server for interfacing with a web browser on a client and an API server for interfacing with an application on a client using APIs. Client interface module 260 comprises lines of software code executed by server 210.

Server 210 sends customized data 245 and, optionally, control data 246 to client 410. Here, client 410 is being operated by the user associated with user ID 270, and thus, customized data 245 has been customized for that particular user.

Client 410 is a computing device, such as a desktop computer, laptop computer, mobile device (such as a smartphone), table device, smart television, in-car entertainment system or other computer. Client 410 comprises a central processing unit, memory, and a non-volatile storage device (such as one or more hard disk drives or solid state drives). Client 410 runs operating system 411 (such as Microsoft Windows, Apple iOS, Google Android, proprietary in-car entertainment system OS, smart television OS, etc.), application 412, application 413, and web browser 414 (such as Microsoft Internet Explorer, Safari, or Chrome). Operating system 411, application 412, application 413, and web browser 414 are software applications comprising lines of software code run by the CPU of client 410.

Client 410 receives customized data 245 and plays it on the video and/or audio system of client 410 using application 412 or web browser 414. For example, video can be played on a screen of client 410, and audio can be played on a speaker or headphones of client 410. Thus, client 410 receives customized data 245 which is a customized product based upon data 285.

Client 410 optionally communicates with server 420 as well. Server 420 can provide additional content 445 to client 410 as described above. Server 420 comprises a central processing unit, memory, non-volatile storage (such as one or more hard disk drives or solid state drives), and a network interface.

Figure 5A:
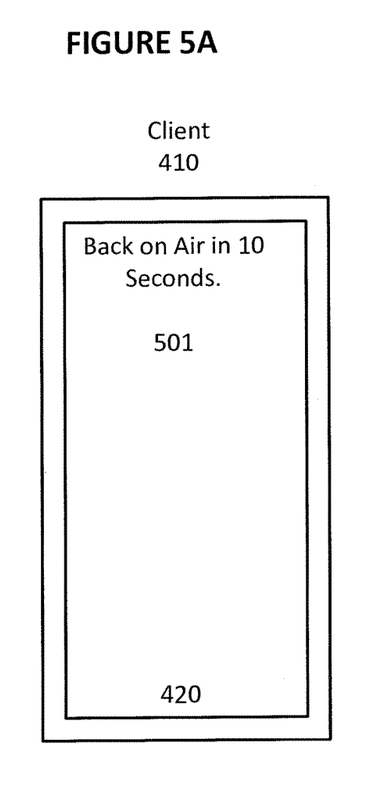
FIGS. 5A, 5B, and 5C depict user interface and control features for a client in conjunction with the playing of the customized data.
Figures 5B, 5C:
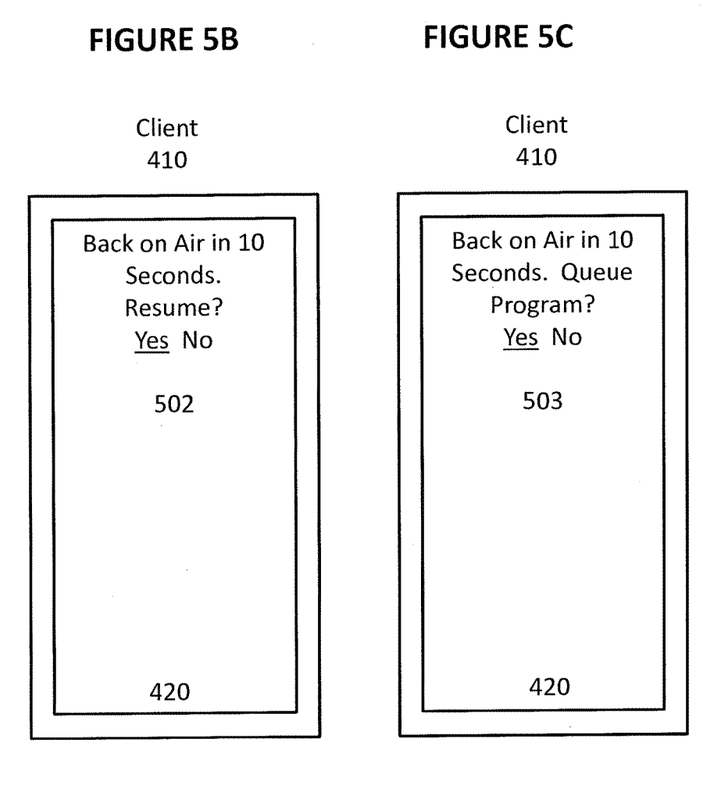

With reference to FIGS. 5A, 5B, and 5C, exemplary user interfaces and control mechanisms are depicted for client 410. If server 210 is configured to minimize the time delay between data 285 and customized data 245, then it will need to insert content into the non-talking periods without knowing how long the non-talking period will last. For example, if it inserts a customized advertisement, the host may resume talking before the customized advertisement has completed. FIGS. 5A, 5B, and 5C deal with this specific problem. The user can configure client 410 and server 210 to provide customized data 285 in real-time, near-real-time, or in a time-delayed fashion as compared to data 285.

In FIG. 5A, client 410 generates a message 501 on screen 410 that says "Back on Air in 10 Seconds," which indicates to the user that the host will resume talking in 10 seconds. This presumes that there is at least a 10 second delay between data 285 and customized data 245. At the end of the 10 seconds, server 210 will suspend the customized content that is playing on client 310 and will play the talking content from data 285. Optionally, the remainder of the customized content can be inserted into the next empty space created when the host stops talking.

In FIG. 5B, client 410 generates a message 502 on screen 410 that says "Back on Air in 10 Second. Resume? Yes No." This allows the user to elect to resume the desired content from data 285, in which case the customized content will stop as in FIG. 5A, or to not resume the desired content from data 285 (in which case the customized content will continue playing and the talking will resume in mid-stream once the customized content is complete).

In FIG. 5C, client 410 generates a message 503 on screen 420 that says "Back on Air in 10 Seconds. Queue program? Yes No." This allows the user to elect to resume the desired content from data 285 (in which case the customized content will stop as in FIG. 5A or to queue the talking content from data 285 in memory or non-volatile storage within client 410) until the customized content is completed. The desired content from data 285 will be queued and then played once the customized content is completed, which will result in a further temporal delay between data 285 and customized data 245.

Figure 6:
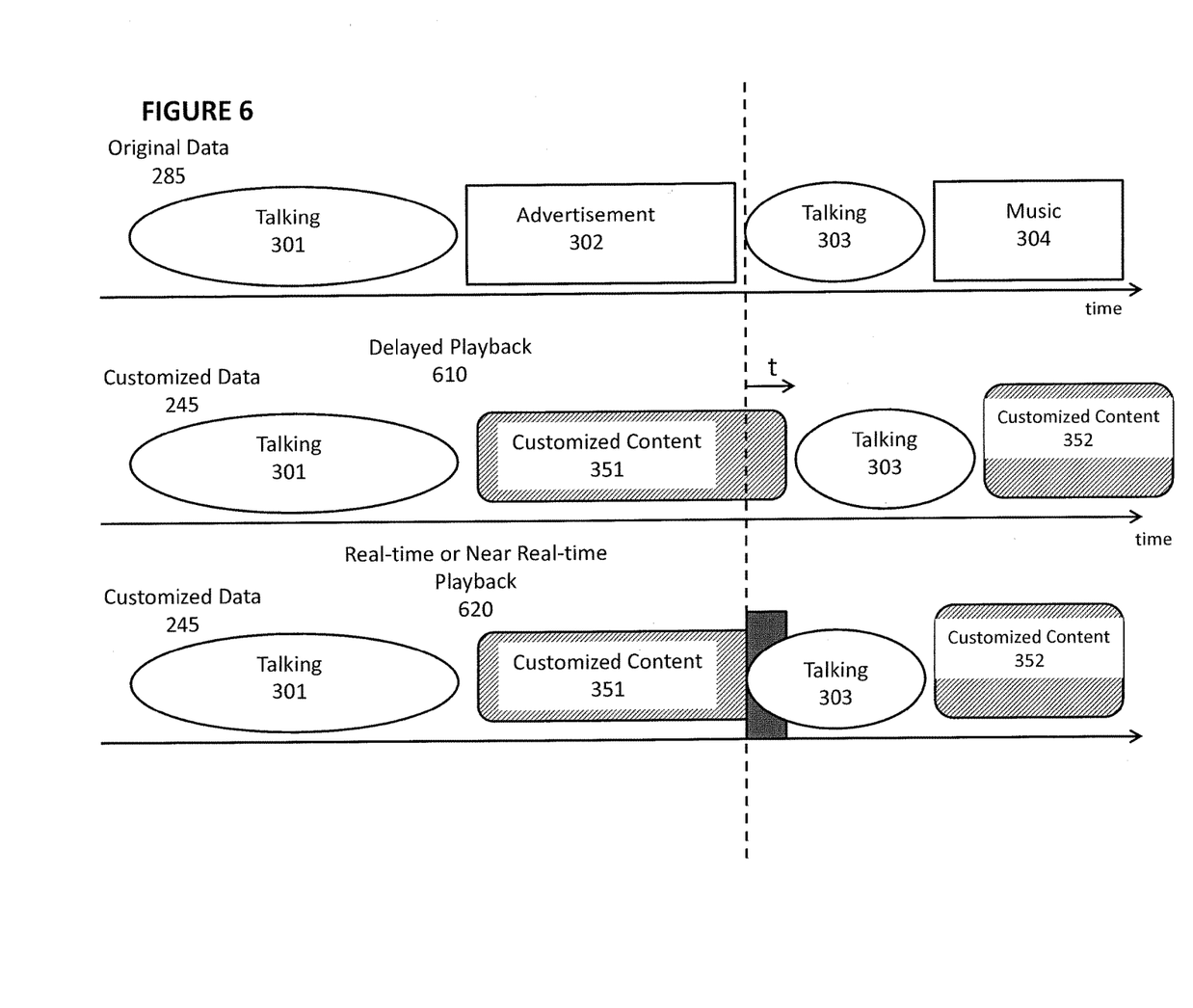
FIG. 6 depicts different options in the temporal sequencing of content in the customized data.

FIG. 6 shows two examples of customized data 245, each with a different time delay. Original data 285 contains the same content described as an example in FIG. 3. Different amounts of time delay are introduced in delayed playback 610 and real-time or near real-time playback 620. As can be seen in FIG. 6, data sequence 351 of customized content in delayed playback 610 is temporally longer than advertisement 302 that it is replacing. If the user elects to play customized content 351 in its entirety (such as through the use of the queuing feature described previously with reference to FIG. 5C), then a delay t will be incurred prior to the resumption of talking 303. By contrast, in real-time or near real-time playback 620, client 410 stops playing data sequence 351 of customized content and begins playing data sequence 303 of talking content 303 as soon as data sequence 303 of talking begins in original data 285 (such as through the use of the resume feature described previously with reference to FIG. 5B).

Figure 8:
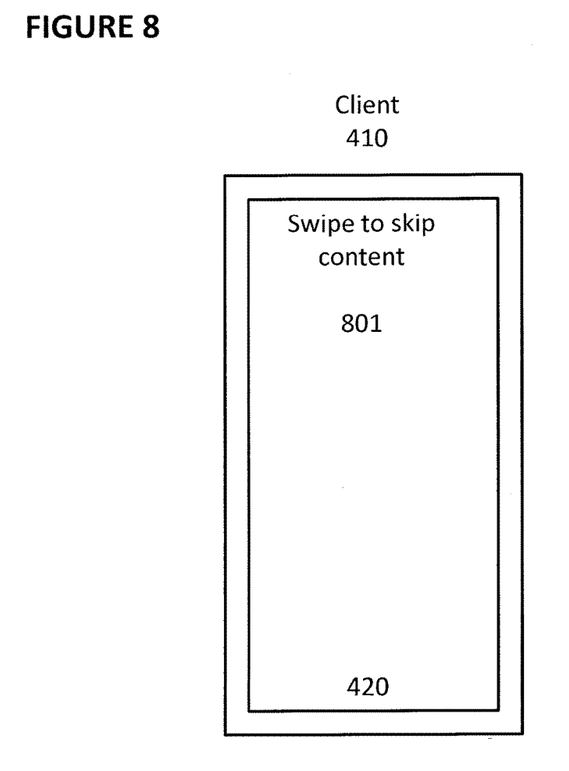
FIG. 8 depicts a client for receiving and playing customized data.

FIG. 8 depicts another optional embodiment. Client 410 generates a message 801 on screen 420 that says "Swipe to skip content." The user then can swipe screen 410 to skip the content that is playing on client 410. For example, if a host is talking, the user can swipe the screen to cause client 410 to skip the remainder of the data sequence currently being played and to play the next data sequence.

References to the present invention herein are not intended to limit the scope of any claim or claim term, but instead merely make reference to one or more features that may be covered by one or more of the claims. Materials, processes and numerical examples described above are exemplary only, and should not be deemed to limit the claims. It should be noted that, as used herein, the terms "over" and "on" both inclusively include "directly on" (no intermediate materials, elements or space disposed there between) and "indirectly on" (intermediate materials, elements or space disposed there between).

What is claimed is:

1. A method of generating customized audio data for a user operating a client, comprising:
   receiving, by a server, original audio data from a data source, wherein the data source comprises data from a live radio broadcast;
   adding, by the server, timestamp information to the original audio data to generate timestamped audio data;
   identifying, by the server, a period of silence in the timestamped audio data that exceeds a predetermined threshold;
   generating, by the server, a data structure that indicates the location of the period of silence within the timestamped audio data using the timestamp information;
   replacing, by the server utilizing the data structure, the period of silence in the timestamped audio data with digital content customized for the user to generate customized audio data, the customized audio data comprising a portion of the original audio data and the digital content customized for the user; and
   providing, by the server, the customized audio data to the client and playing the customized audio data by the client.

2. The method of claim 1, wherein the digital content customized for the user comprises advertisements.

3. The method of claim 1, wherein the digital content customized for the user comprises music.

4. The method of claim 1, further comprising:
   stopping the playing of the digital content customized for a user and playing a portion of the original audio data in response to a command from the user.

5. The method of claim 1, further comprising:
   queuing in a buffer a portion of the original audio data and playing the portion after the playing of the digital content customized for a user in response to a command from the user.

6. The method of claim 1, wherein a temporal length of the period of silence is different than the temporal length of the digital content customized for a user.

7. A system for generating customized audio data for a user operating a client, the system comprising:
   a server comprising a processing unit for receiving original audio data from a data source comprising data from a live radio broadcast, the server configured to add timestamp information to the original audio data to generate timestamped audio data and to identify a period of silence that exceeds a predetermined threshold in the timestamped audio data using the timestamp information and to generate, by analyzing the original audio data, a data structure that contains a portion of the timestamp information to indicate the location of the period of silence within the timestamped audio data; and
   a content unit, contained within the server or the client, for utilizing the data structure to replace the period of silence with digital content customized for the user to generate customized audio data comprising a portion of the original audio data and the digital content customized for the user and playing the customized audio data by the client;
   wherein if the content unit is contained within the server, then the server is configured to transmit the customized audio data to the client.

8. The system of claim 7, wherein the digital content customized for a user comprises advertisements.

9. The system of claim 7, wherein the digital content customized for a user comprises local content.

10. The system of claim 7, wherein the digital content customized for the user comprises music.

11. The system of claim 7, wherein the client or server is configured to stop the playing of the digital content customized for a user and to play a portion of the original audio data in response to a command from the user.

12. The system of claim 7, wherein the client or server is configured to queue in a buffer a portion of the original audio data and to play the portion after the playing of the digital content customized for a user in response to a command from the user.

13. The system of claim 7, wherein a temporal length of the period of silence is different than the temporal length of the digital content customized for a user.

14. The system of claim 7, wherein the content unit is contained within the client and the digital content customized for a user is obtained by the client from a second server.

15. The system of claim 7, wherein the content unit is contained within the client and the digital content customized for a user is obtained by the client from non-volatile storage within the client.

* * * * *